US008889043B2

(12) United States Patent
Wang et al.

(10) Patent No.: US 8,889,043 B2
(45) Date of Patent: Nov. 18, 2014

(54) OPTICAL FILMS CAST FROM STYRENIC FLUOROPOLYMER SOLUTIONS

(75) Inventors: Bin Wang, Kingsport, TN (US);
Thauming Kuo, Kingsport, TN (US);
Douglas Stephens McWilliams, Piney Flats, TN (US); Frank W. Harris, Boca Raton, FL (US); Ted Calvin Germroth, Kingsport, TN (US); Jiaokai Jing, Uniontown, OH (US); Dong Zhang, Uniontown, OH (US); Xiaoliang Zheng, Hudson, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 0 days.

(21) Appl. No.: 13/461,372

(22) Filed: May 1, 2012

(65) Prior Publication Data

US 2012/0283371 A1 Nov. 8, 2012

Related U.S. Application Data

(63) Continuation-in-part of application No. 12/890,011, filed on Sep. 24, 2010, now Pat. No. 8,802,238, which is a continuation-in-part of application No. 11/731,367, filed on Mar. 29, 2007, now Pat. No. 8,226,860, and a continuation-in-part of application No. 12/229,401, filed on Aug. 22, 2008.

(51) Int. Cl.
*B29D 11/00* (2006.01)
*B29C 39/20* (2006.01)

(52) U.S. Cl.
USPC .......... 264/1.35; 264/1.36; 264/1.7; 264/212; 427/536; 427/163.1

(58) Field of Classification Search
USPC ......... 264/1.1, 1.34, 1, 35, 1.7, 2.7, 212, 213, 264/216, 446, 483, 1.36, 82; 427/535, 536, 427/162, 163.1
See application file for complete search history.

(56) References Cited

U.S. PATENT DOCUMENTS

| | | |
|---|---|---|
| 3,386,965 A | 6/1968 | Huffman |
| 4,461,886 A | 7/1984 | Rogers et al. |
| 4,505,543 A | 3/1985 | Ueba et al. |
| 5,039,785 A | 8/1991 | Irwin |
| 5,160,619 A | 11/1992 | Yamaguchi et al. |
| 5,177,149 A | 1/1993 | Angeli et al. |
| 5,189,538 A | 2/1993 | Arakawa |
| 5,244,713 A | 9/1993 | Nakamusa et al. |
| 5,290,887 A | 3/1994 | Hefner et al. |
| 5,387,657 A | 2/1995 | Hefner et al. |
| 5,396,355 A | 3/1995 | Wada et al. |
| 5,427,712 A | 6/1995 | Nakamura et al. |
| 5,529,818 A | 6/1996 | Tsuda et al. |
| 5,532,322 A | 7/1996 | Kadono et al. |
| 5,580,950 A | 12/1996 | Harris et al. |
| 5,677,390 A | 10/1997 | Dadgar et al. |
| 5,698,676 A | 12/1997 | Dhaon |
| 5,985,942 A | 11/1999 | Steck et al. |
| 6,115,095 A | 9/2000 | Suzuki et al. |
| 6,175,400 B1 | 1/2001 | Duncan et al. |
| 6,881,454 B2 | 4/2005 | Taguchi |
| 7,037,443 B2 | 5/2006 | Shuto et al. |
| 7,135,211 B2 | 11/2006 | Shuto et al. |
| 7,211,304 B2 | 5/2007 | Elman et al. |
| 7,227,602 B2 | 6/2007 | Jeon et al. |
| 7,236,221 B2 | 6/2007 | Ishikawa et al. |
| 2002/0041352 A1 | 4/2002 | Kuzuhara et al. |
| 2004/0051831 A1 | 3/2004 | Su Yu et al. |
| 2004/0091667 A1 | 5/2004 | Bermel |
| 2005/0057714 A1 | 3/2005 | Jeon et al. |
| 2005/0105027 A1 | 5/2005 | Wada et al. |
| 2005/0163958 A1 | 7/2005 | Nakatsugawa |
| 2005/0200792 A1 | 9/2005 | Jeon et al. |
| 2005/0270458 A1 | 12/2005 | Ishikawa et al. |
| 2006/0062935 A1 | 3/2006 | Murakami |
| 2006/0114383 A1 | 6/2006 | Kobayashi et al. |
| 2007/0020407 A1 | 1/2007 | Umemoto et al. |
| 2007/0046870 A1 | 3/2007 | Murakami et al. |
| 2007/0087132 A1 | 4/2007 | Greener |
| 2007/0177087 A1 | 8/2007 | Kawahara et al. |
| 2008/0239491 A1 | 10/2008 | Zheng et al. |
| 2008/0241565 A1 | 10/2008 | Germroth et al. |
| 2009/0068380 A1 | 3/2009 | Zheng et al. |
| 2010/0072880 A1 | 3/2010 | Adachi et al. |

| | | | |
|---|---|---|---|
| 2011/0076487 A1* | 3/2011 | Zheng et al. | 428/336 |
| 2011/0230575 A1 | 9/2011 | Roelofs et al. | |
| 2012/0003403 A1 | 1/2012 | Wang et al. | |

FOREIGN PATENT DOCUMENTS

| | | |
|---|---|---|
| EP | 1 506 991 | 2/2005 |
| JP | 63081138 A | 4/1988 |
| JP | 04 215 602 | 8/1992 |
| JP | 2007 046 059 | 2/2007 |
| JP | 2007-063417 | 3/2007 |
| JP | 2007-231224 | 9/2007 |
| JP | 2009-067834 | 4/2009 |
| JP | 2009-079210 | 4/2009 |
| WO | 2008002509 A2 | 1/2008 |
| WO | 2008 121 584 | 10/2008 |

OTHER PUBLICATIONS

Zhang, D., et al., "Mesogen-Jacketed Liquid Crystal Polymers with Mesogens of Aromatic Amide Structure" Polymers for Advanced Technologies, Wiley & Sons, Bognor Regis, GB, vol. 18, No. 4, Apr. 1, 1997, pp. 227-233, XP000691535.

Zhang, et al., "Synthesis of a New Side-Chain Type Liquid Crystal Polymer Poly[dicyclohexyl vinylterephtalate]" Macromolecules, ACS, Washington, DC, U.S., vol. 32, Jan. 1, 1999, pp. 4494-4496, XP002495422, ISSN: 0024-9297.

Zhao, et al., Synthesis and Characterization of Diblock Copolymers Based on Crystallizable Poly(e-caprolactone) and Mesogen-Jacketed Liquid Crystalline Polymer Block: Polymer, Elsevier Science Publishers B.V., GB, vol. 46, No. 14, Jun. 27, 2005, pp. 5396-5405, XP004924379, ISSN: 0032-3861.

Li, et al., "Hierarchical Assembly of a Series of Rod-Coil Block Copolymers: Supramolecular LC Phase in Nanoenvironment" Macromolecules 2004, vol. 37, No. 8, pp. 2854-2860.

Luo, et al., "Conduction Mechanism in a Novel Oxadiazole Derivative: Effects of Temperature and Hydrostatic Pressure" J. Phys. D: Appl. Phys. vol. 38, 2005, pp. 1132-1135, IOP Publishing Ltd. Printed in the UK.

Ito, H.; Oka, W.; Goto, H.; Umeda, H.; Plastic Substrates for Flexible Displays, JP Journal of Applied Physics, vol. 45, No. 5B, 2006, pp. 4325-4329.

Li, F.; Harris, F.W.; Cheng, S.Z.D.; Polyimide Films As Negative Birefringent Compensators for Normally White Twisted Nematic Liquid Crystal Displays, Polymer vol. 37, No. 23, 1996, pp. 5321-5325.

Matthews, A. S.; Kim, I.; HA, C.S.; Fully Aliphatic Polyimides From Adamantane-Based Diamines for Enhanced Thermal Stability, Solubility, Transparency, and Low Dielectric Constant, Dept. of Polymer Science and Engineering, Pusan National University, Busan, 2006, pp. 609-735, Korea.

Mehdipour-Antaei, S.; Babanzadeh, S.; New Types of Heat-Resistant, Flame-Retardant Ferrocene-Based Ployamides With Improved Solubility, Iran Polymer and Petrochemical Institute, P. O. Box 14965/115, Tehran, Iran (Available at ScienceDirect, Reactive & Functional Polymers 67, 2007, pp. 883-892.

Liou, G.S.; Hsiao, S.H.; Ishida, M.; Kakimoto, M.; Imai, Y.; Synthesis and Characterization of Novel Soluble Triphenylamine-Containing Aromatic Polyamides Based on N,N'-BIS(4-Aminophenyl)-N,N'-Diphenyl-1,4-Phenylenediamine; Journal of Polymer Science; Part A: Polymer Chemistry, vol. 40, 2002, pp. 2810-2818.

Phillips, R.E.; Soulen, R.L.; Propylene Oxide Addition to Hydrochloric Acid, Journal of Chemical Education, vol. 72, No. 7, Jul. 1995, pp. 624-625.

Seo, K.B.; Jeong, J.K.; Choi, S.J.; Hong, Y.T.; Suh, D.H.; Synthesis and Characterization of Novel Aromatic-Aliphatic Poly(Amide-Imide-Imide)S (PAII), Die Angewandte Makromolekulare Chemic 264, 1999, oo, pp. 30-38, (Mr 4590).

Ebadi, H.; Mehdipour-Ataei, S.; Heat-Resistant, Pyridine-Based Polyamides Containing Ether and Ester Units With Improved Solubility, Chinese Journal of Polymer Science, vol. 28, No. 1, 2010, pp. 29-37.

Mehdipour-Ataei, S.; Hatami, M.; Mosslemin, M.H.; Organosoluble, Thermally Stable Polyamides Containing Sulfone and Sulfide Units, Chinese Journal of Polymer Science, vol. 27, No. 6, 2009, pp. 781-787.

Chai, C.; Wang, J.; Fan, X.; Chen, X.; Zhou, Q.; Synthesis and Characterization of Mesogen Jacketed Liquid Crystalline Polymer Containing 1, 3, 4-Oxadiazole, Beijing National Laboratory for Molecular Science, Key Laboratory of Polymer Chemistry and Physics of Ministry of Education College of Chemistry and Molecular Engineering, Peking University, Beijing, 2006, 532-535.

Liu, J.M.; Lee, T.M.; Wen, C.H.; Leu, C.M.; High Performance Organic-Inorganic Hybrid Plastic Substrate for Flexible Display and Electronics, MCL, Industrial Technology Research Institute, Chutung, Hsinchu, 310 Taiwan, ROC, SID 10 Digest, pp. 913-916.

International Search Report and Written Opinion, from PCT/US2013/068264, date of mailing Mar. 27, 2014.

International Search Report and Written Opinion, from PCT/US2013/038191, date of mailing Aug. 13, 2013.

* cited by examiner

*Primary Examiner* — Mathieu D. Vargot
(74) *Attorney, Agent, or Firm* — Benesch Friedlander Coplan & Aronoff LLP (57) ABSTRACT

A method for casting a styrenic fluoropolymer film on a substrate includes preparing a polymer solution by dissolving the fluoropolymer in a solvent or solvent blend whose Hansen solubility parameters (HSPs, MPa$^{1/2}$) satisfy the following relations: $|SP_b-SP_p|<5$, $|SP_b-SP_s|<4$, $|SP_{b(H)}-SP_{p(H)}|<7$, and $2<|SP_{b(H)}-SP_{s(H)}|<10$ wherein $SP_b$, $SP_p$, $SP_s$, are the total Hansen solubility parameters of solvent/solvent blend, fluoropolymer, and substrate, respectively; $SP_{b(H)}$, $SP_{p(H)}$, and, $SP_{s(H)}$ are the hydrogen-bond Hansen solubility parameters of solvent/solvent blend, fluoropolymer, and substrate, respectively; wherein the fluoropolymer comprises a moiety of:

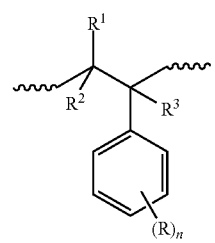

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring.

15 Claims, 2 Drawing Sheets

OPTICAL FILMS CAST FROM STYRENIC FLUOROPOLYMER SOLUTIONS

This application is a continuation-in-part of U.S. Ser. No. 12/890,011, filed Sep. 24, 2010, now U.S. Pat. No. 8,802,238, which is a continuation-in-part of U.S. Ser. No. 12/229,401, filed Aug. 22, 2008, and is a continuation-in-part of U.S. Ser. No. 11/731,367, filed Mar. 29, 2007 now U.S. Pat. No. 8,226,860. This invention relates to an optical film prepared by casting a polymer solution on a substrate. The polymer solution comprises a styrenic fluoropolymer and a solvent or solvent blend that is selected based on Hansen solubility parameters (HSPs) of the fluoropolymer, the substrate, and the solvent/solvent blend to provide an optimized overall property of the optical film in clarity, adhesion, and retardation. The optical film is suitable for use as a phase retarder in an optical device.

FIELD

Background

The concept of solubility parameters was first proposed by Hildebrand in 1916. It relates to the internal energy of solution and solutes. Internal energy is closely related to the internal pressure, which is the energy required to vaporize one cubic centimeter of a substance. Hildebrand proposed that molecules with similar internal pressures would attract and interact with each other. Cohesive energy density (C ED) describes this internal energy and can be calculated from physical properties (CED=($\Delta$H−RT)/$V_m$). The solubility theory predicts that dissolution of a solute will occur in a solvent or solvent blend of similar CED value. The square root of CED is called solubility parameter designated by the Greek letter $\delta$. Therefore, $$\delta = [CED]^{1/2} = [(\Delta H - RT)/V_m]^{1/2} \quad (1)$$

The unit of $\delta$ is $(cal/cm^3)^{1/2}$ or $MPa^{1/2}$ with 1 $(cal/cm^3)^{1/2}$=2.0455 $MPa^{1/2}$. $\Delta H$ is the heat of vaporization, R is the gas constant, T is the temperature, and $V_m$ is the molar volume. Solutes and solvents with similar total solubility values will be miscible, while substances with significantly different total solubility parameters will not be compatible. This method of solubility classification works well with substances that are hydrocarbon-like in nature and do not exhibit much polarity or hydrogen-bonding tendencies (water-like).

Hansen Solubility Parameters

Burrell and Hansen later introduced the concept of partial solubility parameters. They proposed that the solubility parameter (SP) could be represented by three components: dispersion (nonpolar) SP ($\delta_p$), polar SP ($\delta_p$), and hydrogen-bonding SP ($\delta_h$). The total solubility parameter can be mathematically expressed as:

$$\delta_t = (\delta_d^2 \delta_p^2 \delta_h^2)^{1/2} \quad (2)$$

The total solubility parameter, $\delta_t$, of a material is a point in three-dimensional space where the three partial solubility parameter ($\delta_d$, $\delta_p$, and $\delta_h$) vectors meet. These solubility parameters are commonly referred to as Hansen solubility parameters (HSPs). The HSPs of an extensive list of solvents are known and can be found in HANSEN SOLUBILITY PARAMETERS— A User's Handbook, second edition; Charles, M. Hansen; CRC Press, Taylor & Francis Group, Boca Raton, Fla.; 2007, p. 347-483. (hereafter: HANSEN's) This reference lists the values of the three partial HSPs ($\delta_d$, $\delta_p$, and $\delta_h$) for each solvent. The total HSP ($\delta_t$) can be calculated according to equation (2).

HSPs of Solvent Blends

Since the solubility parameters of a large number of solvents are known. One can calculate the values of a solvent blend by using equation (3) where $\Phi$ is the volume fraction of each solvent component in the blend.

$$\delta_{blend} = \Phi_1 \delta_1 + \Phi_2 \delta_2 + \Phi_3 \delta_3 \quad (3)$$

Each HSP ($\delta_t$, $\delta_d$, $\delta_p$, or $\delta_h$) of the blend can be calculated according to equation (3) by using the volume fraction and the corresponding HSP of each solvent component.

HSPs of Polymers

Hansen solubility parameters of a polymer can be determined by testing the solubility of the polymer in a series of solvents. The HSPs of the polymer are expected to be closer to those of the good solvents and be further away from the values of the non-solvents. A computer program or a graphical method can be utilized to analyze and obtain the best fit from the results of the solubility test. In addition to HSPs of the polymer, an interaction radius, $R_0$, can also be generated. The radii of the three two-dimensional plots of $\delta_d$ vs. $\delta_p$, $\delta_d$ vs. $\delta_h$, and $\delta_p$ vs. $\delta_h$ are first obtained and then used to plot a sphere in a three-dimensional space of $\delta_d$ vs. $\delta_p$ VS. $\delta_h$. The radius of the resulting optimized sphere is the interaction radius, $R_0$. Solvents within the solubility sphere are good solvents for the polymer, while those outside the sphere are poor solvents.

The distance in the three-dimensional space between two data points representing the polymer and a solvent can be calculated by the equation:

$$R_a = [4(\delta_{d2} - \delta_{d1})^2 + (\delta_{p2} - \delta_{p1})^2 + (\delta_{h2} - \delta_{h1})^2]^{1/2} \quad (4)$$

where $\delta_{d2}$, $\delta_{p2}$, and $\delta_{h2}$ are associated with the solvent and $\delta_{d1}$, $\delta_{p1}$, and $\delta_{h1}$ are with the polymer and at the center of the solubility sphere. Thus, a solvent having $R_a < R_0$ would be a good solvent for the polymer, having $R_a = R_0$ a borderline solvent, and having $R_a > R_0$ a poor solvent. Besides solubility, other properties that are capable of reflecting polymer affinities to the solvents can also be used to generate HSPs of a polymer, such as intrinsic viscosity, surface attack, chemical resistance, swelling, and environmental stress cracking. A list of HSPs and $R_0$s of commercial polymers can be found in HANSEN's p. 493-505.

Solvent Selection

Solvents that best match the total and partial HSPs of a polymer will have the most affinity to the polymer and thus the highest solubility. However, these solvents may not be the most suitable solvents for the polymer in a film-casting system. The optimal solvents will depend on what are desired in the system. Factors that can affect the solvent selection besides solubility are, for example, cost, toxicity, volatile organic compounds (VOCs), evaporation rate, drying speed, compatibility with other components, solution viscosity, solution rheology, film forming property, and film properties (mechanical and optical). These factors are likely to interact and thus affect one another, which makes it even more difficult to select the suitable solvents for a system.

US Patent Application No. 2011/0076487 discloses an optical compensation film prepared by casting a polymer solution comprising styrenic fluoropolymer on a substrate. The optical film exhibits a positive out-of-plane birefringence and can be used as a compensation film (C-plate) in a liquid crystal display (LCD), particularly in an in-plane switching LCD (IPS-LCD), to improve the viewing quality of the image. Substrates that are commonly used for this application include triacetylcellulose (TAC), cyclic olefin polymer (COP), polyester, polyvinyl alcohol, cellulose ester, cellulose acetate propionate (CAP), polycarbonate, polyacrylate, and polyolefin.

Among the properties, film clarity, adhesion to the substrate, and the retardation value are required for the successful application of such optical films in a device. Since the films are cast from polymer solutions, the most suitable solvents/solvent blends are selected to provide these desired properties. A good solvent for the polymer would yield a film with good clarity; however, the film might not have adequate adhesion to the substrate. Likewise, a solvent that yields good adhesion to the substrate might not provide the desired retardation value. Thus, there exists a need for a method for the selection of solvents or solvent blends that are capable of providing a good balance of properties required for an optical film.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

In an effort to obtain the best overall properties of the optical film based on styrenic fluoropolymer, the present inventors have discovered that a solvent or solvent blend can be selected based on Hansen solubility parameters (HSPs) of the polymer, the substrate, and the solvent/solvent blend. Films cast from the fluoropolymer in such solvents exhibit an optimal overall property in clarity, adhesion to the substrate, and retardation.

In one embodiment, this invention provides a method for casting a styrenic fluoropolymer film on a substrate comprising the step of preparing a polymer solution by dissolving the fluoropolymer in a solvent or solvent blend whose Hansen solubility parameters (HSPs, $MPa^{1/2}$) satisfy the following relations:

$$|SP_b-SP_p|<5, |SP_b-SP_s|<4, |SP_{b(H)}-SP_{p(H)}|<7, \text{ and}$$
$$2<|SP_{b(H)}-SP_{s(H)}|<10$$

wherein $SP_b$, $SP_p$, $SP_s$ are the total Hansen solubility parameters of solvent/solvent blend, fluoropolymer, and substrate respectively; $SP_{b(H)}$, $SP_{p(H)}$, and, $SP_{s(H)}$ are the hydrogen-bond Hansen solubility parameters of solvent/solvent blend, fluoropolymer, and substrate respectively; said fluoropolymer comprises a moiety of:

wherein $R_1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring.

Examples of the substituent R on the styrenic ring include alkyl, substituted alkyl, halogen, hydroxyl, carboxyl, nitro, alkoxy, amino, sulfonate, phosphate, acyl, acyloxy, phenyl, alkoxycarbonyl, cyano, and the like.

A solvent/solvent blend may satisfy the relation of $|SP_b-SP_p|<5$; however, it cannot be a suitable solvent if the hydrogen-bond HSP of the solvent/solvent blend is significantly different from that of the polymer. Thus, a relation of $|SP_{b(H)}-SP_{p(H)}|<7$ is required. In order to provide good adhesion, a solvent/solvent should satisfy $|SP_b-SP_s|<4$. However, the solvent/solvent blend cannot have HSPs closely related to those of the substrate or it will significantly dissolve the substrate. Thus, in one embodiment, a relation of $2<|SP_{b(H)}-SP^{s(H)}|<10$ is chosen. The values of the HSPs stated throughout the description of this invention are all in the unit of $MPa^{1/2}$. Utilization of a different unit such as $(cal/cm^3)^{1/2}$ not only can change the values of the HSPs, it can also alter the HSP relations.

In another embodiment, the Hansen solubility parameter (HSP) relations in the invention are $|SP_b-SP_p|<4$, $|SP_b-SP_s|<3$, $|SP_{b(H)}-SP_{p(H)}|<6$, and $3<|SP_{b(H)}-SP_{s(H)}|<8$, and in yet another, the relations are $|SP_b-SP_p|<3$, $|SP_b-SP_s|<2$, $|SP_{b(H)}-SP_{p(H)}|<5$, and $4<|SP_{b(H)}-SP_{s(H)}|<7$.

One or more solvents may be required to satisfy the HSP relations. A solvent blend may be prepared by combining two or more solvents at certain ratios to yield a solvent mixture that can provide the best overall property. Each solvent that is used to make up the solvent blend may or may not satisfy the HSP relations. Thus, it is possible to combine two or more solvents that are considered poor solvents for the fluoropolymer to yield a solvent blend that is fit for use in this invention.

Examples of solvents that may be used to satisfy the HSP relations of this invention can be found in HANSEN's, p. 347-483, the content of which is incorporated herein by reference. The reference lists dispersion $HSP(SP_{b(D)})$, polar HSP ($SP_{b(P)}$), and hydrogen-bond $HSP(SP_{b(H)})$ for each solvent, from which the HSPs of a solvent blend can be calculated according to equation (3). The total HSP of each solvent/solvent blend ($SP_b$) can be calculated according to equation (2). It is noted that the symbol $SP_b$ represents Hansen solubility parameter of either a single solvent or a solvent blend throughout the description of this invention.

The styrenic fluoropolymer may be a homopolymer or a copolymer. The homopolymer may be prepared by polymerization of a fluorine-containing monomer having the structures below:

wherein $R_1$, $R^2$, and $R^3$ are each independently hydrogen atoms, alkyl groups, substituted alkyl groups, or halogens and wherein at least one of $R^1$, $R^2$, and $R^3$ is a fluorine atom, wherein R is each independently a substituent on the styrenic ring, n is an integer from 0 to 5 representing the number of the substituents the styrenic ring.

Examples of such fluorine-containing monomers include, but not limited to, α,β,β-trifluorostyrene, α,β-difluorostyrene, β,β-difluorostyrene, α-fluorostyrene, and β-fluorostyrene. Poly(α,β,β-trifluorostyrene) (PTFS) is a hompolymer used in this invention.

The copolymer may be prepared by copolymerization of one or more of the fluorine-containing monomers with one or more of ethylenically unsaturated monomers. Further description of the styrenic fluoropolymer compositions suitable for this invention and the methods for their preparation is disclosed in US Patent Application No. 20110076487, the content of which is incorporated herein by reference.

The three partial HSPs of the fluoropolymer, dispersion HSP($SP_{p(D)}$), polar HSP ($SP_{p(P)}$), and hydrogen-bond HSP ($SP_{p(H)}$), can be estimated by dissolving a sample of the fluoropolymer in a series of solvents with known HSPs to test the solubility. A computer program can then be utilized to obtain the best fit from the results of the solubility test. As described in Example 1, PTFS was tested for solubility in the solvents listed in Table 3. The results were entered into the computer software, HSPiP by Steven Abbott (3$^{rd}$ edition, 2010), to obtain HSP values with the best fit. The HSPs (in $MPa^{1/2}$) of PTFS thus obtained are: $SP_{p(D)}$=19.87. $SP_{p(P)}$=8.68, $SP_{p(H)}$=5.72, the total $SP_p$=22.43, and the interaction radius $R_0$=9.0.

The casting of a polymer solution onto a substrate may be carried out by a method known in the art such as, for example, spin coating, spray coating, roll coating, curtain coating, or dip coating. The coating has a thickness of about 2-15 μm. The surface of the substrate may or may not be pre-treated to increase the surface energy using a method known in the art such as Corona treatment. Thus, in another aspect, this invention further comprises a step of surface treatment of the substrate by means of Corona treatment. In addition to surface treatments, adhesion of the fluoropolymer coating to various substrates will be improved by removing most or all of the solvent from the polymer solution during drying. This can be accomplished by using high drying temperatures and/or long drying times. Heating the coated surface above the glass transition temperature of the fluoropolymer when possible based upon the substrate will provide significantly improved adhesion. Substrates are known in the art, which include triacetylcellulose (TAC), cyclic olefin polymer (COP), polyester, polyvinyl alcohol, cellulose ester, cellulose acetate propionate (CAP), polycarbonate, polyacrylate, polyolefin, polyurethane, polystyrene, polyimide, and other materials commonly used in an optical device.

HSPs of the illustrative polymers that may be used as substrates can be found in HANSEN's p. 493-505, some examples of which are listed below:

TABLE 1

Hansen Solubility Parameters of Various Polymers

| Sequence Number in Hansen's | Polymer | Dispersion HSP ($SP_{s(D)}$); $MPa^{1/2}$ | Polar HSP ($SP_{s(P)}$); $MPa^{1/2}$ | Hydrogen-Bond HSP ($SP_{s(H)}$); $MPa^{1/2}$ | Interaction Radius ($R_0$); $MPa^{1/2}$ |
|---|---|---|---|---|---|
| 170 | Cellulose Acetate | 16.90 | 16.30 | 3.70 | 13.70 |

TABLE 1-continued

Hansen Solubility Parameters of Various Polymers

| Sequence Number in Hansen's | Polymer | Dispersion HSP ($SP_{s(D)}$); $MPa^{1/2}$ | Polar HSP ($SP_{s(P)}$); $MPa^{1/2}$ | Hydrogen-Bond HSP ($SP_{s(H)}$); $MPa^{1/2}$ | Interaction Radius ($R_0$); $MPa^{1/2}$ |
|---|---|---|---|---|---|
| 460 | TOPAS 6013 (COC polymer) | 18.00 | 3.00 | 2.00 | 5.00 |
| 399 | Polycarbonate | 19.10 | 10.90 | 5.10 | 12.10 |
| 401 | PET (polyester) | 19.10 | 6.30 | 9.10 | 4.80 |
| 402 | Polyimide | 24.30 | 19.50 | 22.90 | 21.60 |
| 403 | PMMA | 19.30 | 16.70 | 4.70 | 17.40 |
| 68 | Polystyrene | 22.28 | 5.75 | 4.30 | 12.68 |

The HSPs of cellulose acetate can vary significantly depending on the degree of esterification of the particular sample measured. The data for other polymers can also vary depending on the method used for determination. The cellulose triacetate (TAC) used in the example has $SP_{s(D)}$=13.3, $SP_{s(P)}$=4.22, $SP_{s(H)}$=10.92, and $SP_s$=17.72, and the cyclic olefin polymer (COP) used is assumed to have HSP values close to those of the COC polymer listed in Table 1: $SP_{s(D)}$=18.00, $SP_{s(P)}$=3.00, $SP_{s(H)}$=2.00, and $SP_s$=18.36.

Solvents having HSPs closely related to those of the fluoropolymers would exhibit good solubility; however, they do not necessarily need to be the solvents of choice to provide the desirable properties when used to coat the fluoropolymer on a substrate. A solvent/solvent blend having borderline solubility to the polymer and the substrate is likely to be the preferred choice to provide the best overall properties. Additionally, the polymer solutions prepared from such borderline solvents typically exhibit a lower viscosity, which is desirable for ease of application.

Non-limiting examples of solvents/solvent blends that are suitable for use to coat PTFS on a TAC or COP substrate include one of more selected from methyl isopropyl ketone (MIPK), acetone, methyl ethyl ketone (MEK), methyl isobutyl ketone (MIBK), cyclohexanone, methylene chloride (MeCl$_2$), chloroform, methyl acetate, ethyl acetate, n-butyl acetate, propylene glycol methyl ether acetate (PGMEA), ethylene glycol butyl ether acetate, toluene, cyclopentanone, 1,4-dioxane, acetophenone, chlorobenzene, nitrobenzene, N-methyl-2-pyrrolidone, and N,N-dimethylformamide. HSP values of each solvent are listed in Table 2, where $SP_{b(D)}$, $SP_{b(P)}$, and $SP_{b(H)}$ are obtained from the HANSEN's and $SP_b$ is calculated according to equation (2).

TABLE 2

Hansen Solubility Parameters of Various Solvents

| Solvent | Hansen Solubility Parameter $MPa^{1/2}$ | | | |
|---|---|---|---|---|
| | $SP_b$ | $SP_{b(D)}$ | $SP_{b(P)}$ | $SP_{b(H)}$ |
| Methyl isopropyl ketone | 18.02 | 14.80 | 6.20 | 8.20 |
| Acetone | 19.94 | 15.50 | 10.40 | 7.00 |
| Methyl ethyl ketone | 19.05 | 16.00 | 9.00 | 5.10 |
| Methyl isobutyl ketone | 16.97 | 15.30 | 6.10 | 4.10 |
| Cyclohexanone | 19.56 | 17.8 | 6.3 | 5.1 |
| Methylene Chloride | 20.26 | 18.20 | 6.40 | 6.20 |
| Chloroform | 18.07 | 17.8 | 3.10 | 0.00 |
| Methyl acetate | 18.70 | 15.5 | 7.2 | 7.6 |
| Ethyl acetate | 18.15 | 15.8 | 5.3 | 7.2 |
| n-Butyl acetate | 17.41 | 15.8 | 3.7 | 6.3 |

TABLE 2-continued

Hansen Solubility Parameters of Various Solvents

| Solvent | Hansen Solubility Parameter MPa$^{1/2}$ | | | |
|---|---|---|---|---|
| | $SP_b$ | $SP_{b(D)}$ | $SP_{b(P)}$ | $SP_{b(H)}$ |
| Propylene glycol methyl ether acetate | 18.44 | 16.10 | 6.10 | 6.60 |
| Ethylene glycol butyl ether acetate | 18.21 | 15.3 | 4.5 | 8.8 |
| Toluene | 18.16 | 18 | 1.4 | 2 |
| Cyclopentanone | 22.11 | 17.90 | 11.90 | 5.20 |
| 1,4-Dioxane | 20.5 | 19 | 1.8 | 7.4 |
| Acetophenone | 21.8 | 19.6 | 8.6 | 3.7 |
| Chlorobenzene | 19.6 | 19 | 4.3 | 2 |
| Nitrobenzene | 22.2 | 20 | 8.6 | 4.1 |
| N-Methyl-2-pyrrolidone | 22.9 | 18 | 12.3 | 7.2 |
| N,N-Dimethylformamide | 24.8 | 17.4 | 13.7 | 11.3 |
| Cyclohexanone | 19.56 | 17.8 | 6.3 | 5.1 |

It was found that, when TAC was used as the substrate, solvents/solvent blends having a total HSP($SP_b$) around 18-19 provided better properties in film clarity, adhesion to the substrate, as well as retardation values. Such solvents/solvent blends have the total HSPs close to that of the TAC substrate; however, they have significant differences in $SP_{b(H)}$ (>4). This allows the PTFS coating to have good adhesion without affecting the film clarity and significantly reducing the retardation value. Examples of such solvents include PGMEA, MIPK, toluene, blends of PGMEA and ethyl acetate, blends of MEK and toluene, blends of MIPK and toluene, and blends of MeCl$_2$ and MIPK. Non-limiting examples of the solvents include PGMEA. MIPK, toluene, PGMEA/ethyl acetate (50/50), MEK/toluene (70/30), MIPK/toluene (70/30), and MIPK/MeCl$_2$ (70/30) by weight.

The HSPs of some examples of the solvent blends are listed in Table 3. The values are calculated according to Equation (3) and as illustrated in Example 2.

TABLE 3

Hansen Solubility Parameters of Various Solvent Blends

| Solvent Blend (weight %) | Hansen Solubility Parameter MPa$^{1/2}$ | | | |
|---|---|---|---|---|
| | $SP_b$ | $SP_{b(D)}$ | $SP_{b(P)}$ | $SP_{b(H)}$ |
| PGMEA/ethyl acetate (50/50) | 18.28 | 15.94 | 5.69 | 6.91 |
| MEK/toluene (70/30) | 18.42 | 16.57 | 6.85 | 4.22 |
| MIPK/toluene (70/30) | 17.65 | 15.71 | 4.84 | 6.45 |
| MIPK/MeCl$_2$ (70/30) | 18.71 | 15.82 | 6.24 | 7.79 |
| acetone/MIBK (60/40) | 18.64 | 15.42 | 8.69 | 5.85 |
| MEK/MIPK (70/30) | 18.64 | 15.64 | 8.16 | 6.03 |
| Cyclopentanone/toluene (70/30) | 20.30 | 17.93 | 8.56 | 4.18 |

When the substrate is COP, examples of suitable solvents include cyclopentanone, blends of acetone and MIBK, blends of MEK and MIBK, blends of cyclopentanone and toluene, blends of cyclopentanone and MeCl$_2$, and blends of MIPK and toluene. Non-limiting examples of the solvents include acetone/MIBK (60/40) and MIPK/toluene (70/30) by weight.

Acetone ($SP_b$=16.97) and MIBK($SP_b$-19.94) are each not miscible with PTFS. However, polymer solutions with good clarity were prepared by mixing the two at 40/60, 50/50, 60/40, 70/30, and 80/20 ratios by weight. The total HSP of each solvent blend is calculated to be: 18.05; 18.34; 18.64; 18.95; 19.27. Thus, this invention further provides an embodiment where the styrenic fluoropolymer is PTFS and HSP of the solvent/solvent blend is 17.5<$SP_b$<19.5.

Adhesion promoters may be used to further improve the adhesion of the styrenic fluoropolymer to the substrate. For instance, an adhesion promoter can be mixed in the polymer solution and cast with the polymer to form a coating film. Accordingly, a suitable adhesion promoter is soluble in the desired solvent and compatible with the styrenic fluoropolymer. It is further desired that the adhesion promoter not significantly reduce the retardation value of the optical film.

Examples of suitable adhesion promoters include, without limitation, those available from Eastman Chemical Company (Kingsport, Tenn.): chlorinated polyolefins such as Eastman Chlorinated Polyolefin 164-1®, 343-1®, and 515-2®; non-chlorinated polyolefin such as Eastman Chlorinated Polyolefin 550-1®; rosins such as Abitol E® (hydrogenated gum rosin), Permalyn 3100® (tall oil rosin ester of pentacrythritol), Permalyn 2085® (tall oil rosin ester of glycerol), Permalyn 6110® (gum rosin ester of pentaerythritol), and Foralyn 110® (hydrogenated gum rosin ester of pentaerythritol); and aminosilanes available from Evonik Industries such as Dynasylan 1122® and Dynasylan SIVO 210®.

EXAMPLES

Example 1

Solubility Test of PTFS in Various Solvents

A sample of PTFS (e.g. 1 g) was mixed with each solvent (e.g. 10 g) listed in Table 4 in a container. Each mixture was allowed to be sufficiently mixed over time, and the observation of the solubility was recorded.

TABLE 4

Solubility Test of PTFS in Various Solvents

| Solvent | Hansen Solubility Parameter MPa$^{1/2}$ | | | | Miscibility with PTFS |
|---|---|---|---|---|---|
| | $SP_b$ | $SP_{b(D)}$ | $SP_{b(P)}$ | $SP_{b(H)}$ | |
| Methyl isopropyl ketone | 18.02 | 14.80 | 6.20 | 8.20 | Good |
| Acetone | 19.94 | 15.50 | 10.40 | 7.00 | Poor |
| Methyl ethyl ketone | 19.05 | 16.00 | 9.00 | 5.10 | Good |
| Methyl isobutyl ketone | 16.97 | 15.30 | 6.10 | 4.10 | Poor |
| Cyclohexane | 16.80 | 16.8 | 0 | 0.2 | Poor |
| Methylene Chloride | 20.26 | 18.20 | 6.40 | 6.20 | Good |
| Chloroform | 18.07 | 17.8 | 3.10 | 0.00 | Good |
| Hexane | 15.00 | 15.00 | 0.00 | 0.00 | Poor |
| Heptane | 15.30 | 15.30 | 0.00 | 0.00 | Poor |

TABLE 4-continued

Solubility Test of PTFS in Various Solvents

| Solvent | Hansen Solubility Parameter MPa$^{1/2}$ | | | | Miscibility with PTFS |
|---|---|---|---|---|---|
| | $SP_b$ | $SP_{b(D)}$ | $SP_{b(P)}$ | $SP_{b(H)}$ | |
| Ethyl acetate | 18.15 | 15.8 | 5.3 | 7.2 | Good |
| Propylene glycol methyl ether acetate | 18.44 | 16.10 | 6.10 | 6.60 | 1 Good |
| Toluene | 18.16 | 18 | 1.4 | 2 | Good |
| Cyclopentanone | 22.11 | 17.90 | 11.90 | 5.20 | Good |
| Nitrobenzene | 22.2 | 20 | 8.6 | 4.1 | Good |
| N-Methyl-2-pyrrolidone | 22.9 | 18 | 12.3 | 7.2 | Good |
| N,N-Dimethylformamide | 24.8 | 17.4 | 13.7 | 11.3 | Good |
| 1,4-Dioxane | 20.5 | 19 | 1.8 | 7.4 | Poor |
| Acetophenone | 21.8 | 19.6 | 8.6 | 3.7 | Good |
| Chlorobenzene | 19.6 | 19 | 4.3 | 2 | Good |

Example 2

Solubility Test of PTFS in Various Blends of Acetone and MIBK

Acetone and methyl isobutyl ketone (MIBK) were chosen for this experiment because they were miscible and had significantly different HSPs (acetone: $SP_b$=19.19; MIBK: $SP_b$=16.97). They were also found to be poor solvents for PTFS, which was swollen but not dissolved in each solvent. As listed in Table 5, a series of solutions was prepared by mixing PTFS (4 g) in each of the solvent blends (22.66 g) at various acetone/MIBK ratios. The polymer solutions were placed on a roller for 2 days. It was found that the ones with 40/60, 50/50, 60/40, 70/30, and 80/20 ratios by weight were clear, while the 30/70 and 90/10 ones were hazy and the rest contained un-dissolved polymer.

The HSP values of each blend were calculated from the HSPs of acetone and MIBK according to equation (3) as illustrated in the following for the one with acetone/MIBK=60/40 (weight %). (density of acetone=0.792 g/ml: density of MIBK=0.802 g/ml)

Acetone volume %=(60/0.792)/[(60/0.792)+(40/0.802)]=60

MIBK volume %=(40/0.802)/[(60/0.792)+(40/0.802)]=40

$SP_{b(D)}$=0.60×15.5+0.40×15.3=15.42

$SP_{b(P)}$=0.60×10.40+0.40×6.10=8.69

$SP_{b(H)}$=0.60×7.00+0.40×4.10=5.85

$SP_b$=(15.42$^2$8.69$^2$+5.85$^2$)$^{1/2}$=18.64

Example 3

Solution Cast of PTFS in Various Solvents on TAC Substrate

A sample (3 inch×4 inch) of triacetylcellulose (TAC) film was first treated with corona discharge using Laboratory Corona Treater (Model BD-20C; Electro-Technic Products, INC.) for about two minutes. As listed in Table 5, a series of PTFS solutions (15 weight %) was prepared by mixing PTFS powder (4 g; intrinsic viscosity=1.0 dL/g) in various solvents/solvent blends (22.66 g). Each solution was cast on the TAC film (thickness, 80 μm) using a knife applicator. Immediately after casting, the coated film was placed in a force-air oven at 80° C. for 5 minutes to yield a dried coating having thickness ranging from about 5 to about 10 p.m. The experiment was repeated to obtain 3 coating films from each solution. The haze of the films was measured using a spectrophotometer (UltraScan VIS; Hunter Associates Laboratory, Inc.). The coated TAC films were allowed to age for 7 days and their appearances observed. It was found that some coating films were delaminated from the substrates, indicating poor adhesion, while others remained intact. The results are listed in Table 6.

TABLE 5

Hansen Solubility Parameters of Various Blends of Acetone and MIBK

| | | | | | | | | | | | |
|---|---|---|---|---|---|---|---|---|---|---|---|
| Acetone (wt %) | 0 | 10 | 20 | 30 | 40 | 50 | 60 | 70 | 80 | 90 | 100 |
| MIBK (wt %) | 100 | 90 | 80 | 70 | 60 | 50 | 40 | 30 | 20 | 10 | 0 |
| Acetone (Vol %) | 0 | 10 | 20 | 30 | 40 | 50 | 60 | 70 | 80 | 90 | 100 |
| MIBK (Vol %) | 100 | 90 | 80 | 70 | 60 | 50 | 40 | 30 | 20 | 10 | 0 |
| $SP_{b(D)}$ | 15.30 | 15.32 | 15.34 | 15.36 | 15.38 | 15.40 | 15.42 | 15.44 | 15.46 | 15.48 | 15.50 |
| $SP_{b(P)}$ | 6.10 | 6.53 | 6.97 | 7.40 | 7.83 | 8.26 | 8.69 | 9.12 | 9.55 | 9.97 | 10.40 |
| $SP_{b(H)}$ | 4.10 | 4.39 | 4.69 | 4.98 | 5.27 | 5.56 | 5.85 | 6.14 | 6.43 | 6.71 | 7.00 |
| $SP_b$ | 16.97 | 17.23 | 17.49 | 17.76 | 18.05 | 18.34 | 18.64 | 18.95 | 19.27 | 19.60 | 19.94 |

TABLE 6

PTFS Coatings Cast on TAC Using Various Solvents/Solvent Blends

| Sample ID | PTFS (% solids by wt.) | Solvent 1 (wt. %) | Solvent 2 (wt. %) | Runs | Haze % (D65/10°) | Coating Delamination |
|---|---|---|---|---|---|---|
| 1 | 15 | PGMEA 100 | None 0 | #1-1 | 0.3 | No |
|  |  |  |  | #1-2 | 0.39 | No |
|  |  |  |  | #1-3 | 0.36 | No |
| 2 | 15 | Ethyl Acetate 100 | None 0 | #2-1 | 2.94 | Yes |
|  |  |  |  | #2-2 | 0.8 | Yes |
|  |  |  |  | #2-3 | 1.16 | Yes |
| 3 | 15 | MEK 100 | None 0 | #3-1 | 1.22 | Yes |
|  |  |  |  | #3-2 | 0.54 | Yes |
|  |  |  |  | #3-3 | 28.31 | Yes |
| 4 | 15 | MIPK 100 | None 0 | #4-1 | 0.34 | No |
|  |  |  |  | #4-2 | 0.43 | No |
|  |  |  |  | #4-3 | 0.28 | No |
| 5 | 15 | Toluene 100 | None 0 | #5-1 | 0.4 | partially |
|  |  |  |  | #5-2 | 0.32 | partially |
|  |  |  |  | #5-3 | 0.53 | partially |
| 6 | 15 | PGMEA 50 | Ethyl Acetate 50 | #6-1 | 0.31 | No |
|  |  |  |  | #6-2 | 0.4 | No |
|  |  |  |  | #6-3 | 0.62 | No |
| 7 | 15 | Acetone 60 | MIBK 40 | #7-1 | 1.07 | Yes |
|  |  |  |  | #7-2 | 2.23 | Yes |
|  |  |  |  | #7-3 | 0.77 | Yes |
| 8 | 15 | MEK 70 | MIPK 30 | #8-1 | 0.53 | Yes |
|  |  |  |  | #8-2 | 0.56 | Yes |
|  |  |  |  | #8-3 | 0.62 | No |
| 9 | 15 | MEK 70 | Toluene 30 | #9-1 | 0.3 | No |
|  |  |  |  | #9-2 | 0.49 | No |
|  |  |  |  | #9-3 | 0.52 | No |
| 10 | 15 | MIPK 70 | Toluene 30 | #11-1 | 0.35 | No |
|  |  |  |  | #11-2 | 0.32 | No |
|  |  |  |  | #11-3 | 0.27 | No |
| 11 | 15 | Cyclopentanone 100 | None 0 | #12-1 | 0.46 | Yes |
|  |  |  |  | #12-2 | 0.73 | Yes |
|  |  |  |  | #12-3 | 0.3 | Yes |
| 12 | 15 | Cyclopentanone 70 | Toluene 30 | #13-1 | 0.61 | Yes |
|  |  |  |  | #13-2 | 0.38 | Yes |
|  |  |  |  | #13-3 | 0.32 | Yes |
| 13 | 15 | MIPK 70 | MeCl$_2$ 30 | #14-1 | 0.17 | No |
|  |  |  |  | #14-2 | 0.47 | No |
|  |  |  |  | #14-3 | 0.32 | No |

Example 4

Retardation Measurement of the PTFS Coatings Cast on TAC Using Various Solvents

Figure 1:
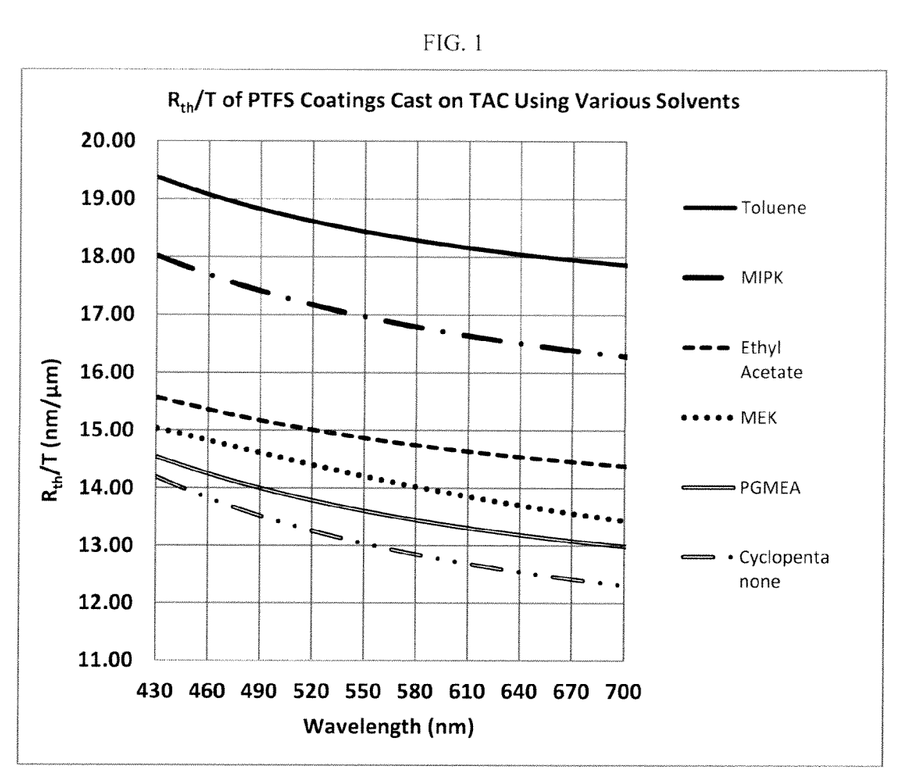
FIG. 1 shows a graph of retardation of PTFS coatings cast on TAC using various solvents; and, FIG. 2 shows a graph of retardation of PTFS coatings cast on TAC using various solvent blends.
Figure 2:
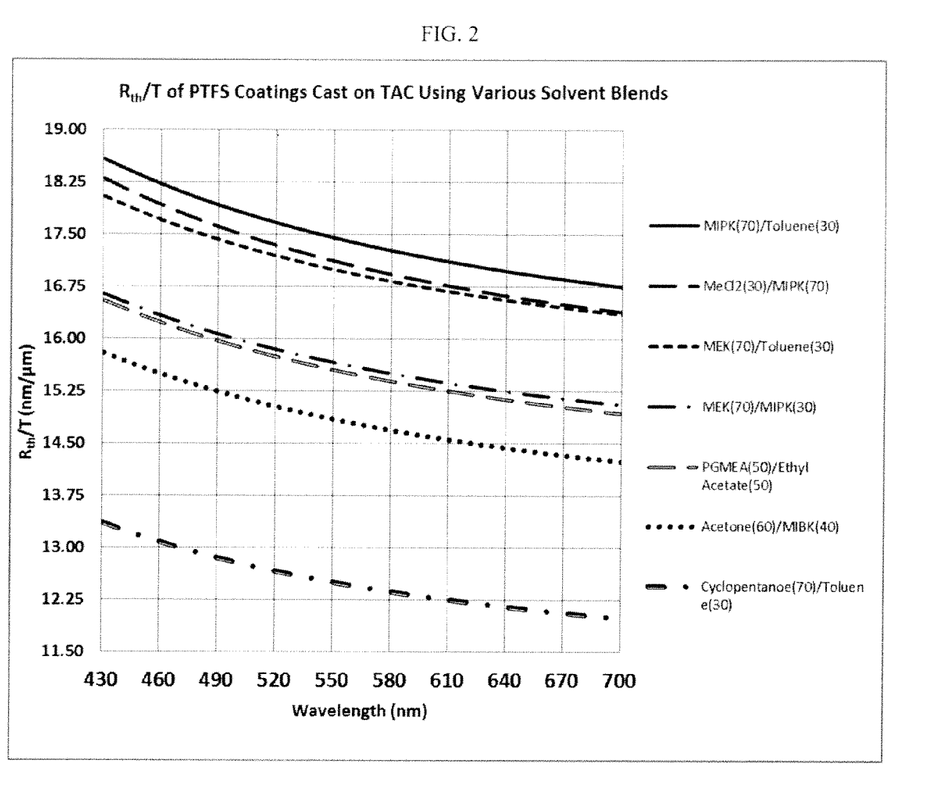

The thickness and the out-of-plane optical retardation ($R_{th}$) of the coated TAC films prepared in Example 3 were measured while the coating films were still adhered to the substrates. The thickness was measured by Metricon 2010 prism coupler, while the retardation by J. A. Woollam M-2000V. The retardation ($R_{th}$, nm) of each coating was calculated by subtracting the $R_{th}$ of the substrate from the overall value. The $R_{th}$ value thus obtained was normalized over the thickness (T, μm) to yield a value of $R_{th}/T$ (nm/μm), which was plotted against wavelength as shown in FIGS. 1 and 2. It is noted that, for ease of differentiation, the identities of the solvents/solvent blends listed in FIGS. 1 and 2 are arranged according to the sequence of the corresponding curves from top to bottom.

Example 5

Hansen Solubility Parameters of Solvents Used for Casting PTFS on TAC

From the results of Examples 3 and 4, it was identified that the solvent/solvent blends listed in Table 7 were capable of providing a good balance of coating properties in film clarity, adhesion, as well as retardation, when used to cast PTFS on TAC substrate. The HSPs of the solvent blends were calculated according to equation (3) and as illustrated in Example 2.

TABLE 7

Hansen Solubility Parameters of Various Solvents for Casting PTFS on TAC

| | Hansen Solubility Parameter MPa$^{1/2}$ | | | |
|---|---|---|---|---|
| Solvent | $SP_b$ | $SP_{b(D)}$ | $SP_{b(P)}$ | $SP_{b(H)}$ |
| MIPK | 18.02 | 14.80 | 6.20 | 8.20 |
| MIPK (70)/Toluene (30) | 17.65 | 15.71 | 4.84 | 6.45 |
| MIPK (70)/MeCl$_2$ (30) | 18.23 | 15.16 | 7.04 | 7.27 |
| MEK (70)/Toluene (30) | 18.42 | 16.57 | 6.85 | 4.22 |
| PGMEA (50)/Ethyl Acetate (50) | 18.28 | 15.94 | 5.69 | 6.91 |

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A method for casting a styrenic fluoropolymer film on a substrate comprising the steps of:
preparing a polymer solution by dissolving the fluoropolymer in a solvent or solvent blend whose Hansen solubility parameters (HSPs, MPa$^{1/2}$) satisfy the following relations: $|SP_b-SP_p|<5$, $|SP_b-SP_s|<4$, $|SP_{b(H)}-SP_{p(H)}|<7$, and $2<|SP_{b(H)}-SP_{s(H)}|<10$, wherein $SP_b$, $SP_p$, $SP_s$ are the total Hansen solubility parameters of solvent/solvent blend, fluoropolymer, and substrate, respectively; $SP_{b(H)}$, $SP_{p(H)}$, and, $SP_{s(H)}$ are the hydrogen-bond Hansen solubility parameters of solvent/solvent blend, fluoropolymer, and substrate, respectively; wherein the fluoropolymer comprises a moiety of:

wherein R$^1$, R$^2$, and R$^3$ are each independently hydrogen atoms, alkyl groups, substituted alkyl groups, or halogens, wherein at least one of R$^1$, R$^2$, and R$^3$ is a fluorine atom, and wherein R is each independently a substituent on the styrenic ring, n is an integer from 0 to 5 representing the number of the substituents on the styrenic ring; and
casting the polymer solution on a substrate.

2. The method of claim 1, wherein the Hansen solubility parameter relations are: $|SP_b-SP_p|<4$, $|SP_b-SP_s|<3$, $|SP_{b(H)}-SP_{p(H)}|<6$, and $3<|SP_{b(H)}-SP_{s(H)}|<8$.

3. The method of claim 1, wherein the Hansen solubility parameter relations are: $|SP_b-SP_p|<3$, $|SP_b-SP_s|<2$, $|SP_{b(H)}-SP_{p(H)}|<5$, and $4<|SP_{b(H)}-SP_{s(H)}|<7$.

4. The method of claim 1, wherein the substituent R on the styrenic ring is selected from the group comprising alkyl, substituted alkyl, halogen, hydroxyl, carboxyl, nitro, alkoxy, amino, sulfonate, phosphate, acyl, acyloxy, phenyl, alkoxycarbonyl, and cyano.

5. The method of claim 1, wherein the styrenic fluoropolymer is poly(α,β,β-trifluorostyrene) (PTFS).

6. The method of claim 1, wherein the styrenic fluoropolymer is poly(α,β,β-trifluorostyrene) (PTFS) and the Hansen solubility parameter of the solvent/solvent blend satisfies $17.5<SP_b<19.5$.

7. The method of claim 1, wherein the styrenic fluoropolymer is PTFS, the substrate is triacetylcellulose (TAC) or cyclic olefin polymer (COP), and the solvent or solvent blend is one or more selected from the group comprising methyl isopropyl ketone (MIPK), acetone, methyl ethyl ketone (MEK), methyl isobutyl ketone (MIBK), cyclohexanone, methylene chloride (MeCl$_2$), chloroform, methyl acetate, ethyl acetate, n-butyl acetate, propylene glycol methyl ether acetate (PGMEA), ethylene glycol butyl ether acetate, toluene, cyclopentanone, 1,4-dioxane, acetophenone, chlorobenzene, nitrobenzene, N-methyl-2-pyrrolidone, and N,N-dimethylformamide.

8. The method of claim 1, wherein the styrenic fluoropolymer is PTFS, the substrate is TAC, and the solvent or solvent blend is chosen from the group comprising PGMEA, MIPK, toluene, blend of PGMEA and ethyl acetate, blend of MEK and toluene, blend of MIPK and toluene, and blend of MeCl$_2$ and MIPK.

9. The method of claim 1, wherein the styrenic fluoropolymer is PTFS, the substrate is TAC, and the solvent or solvent blend is chosen from the group comprising PGMEA, MIPK, toluene, PGMEA/ethyl acetate (50/50), MEK/toluene (70/30), MIPK/toluene (70/30), and MIPK/MeCl$_2$ (70/30) by weight.

10. The method of claim 1, wherein the styrenic fluoropolymer is PTFS, the substrate is COP, and the solvent or solvent blend is chosen from the group comprising cyclopentanone, blend of acetone and MIBK, blend of MEK and MIBK, blend of cyclopentanone and toluene, blend of cyclopentanone and MeCl$_2$, and blend of MIPK/toluene.

11. The method of claim 1, wherein the styrenic fluoropolymer is PTFS, the substrate is COP, and the solvent blend is acetone/MIBK (60/40) or MIPK/toluene (70/30) by weight.

12. The method of claim 1, wherein the method further comprises:
treating the surface of the substrate before the polymer solution is cast.

13. The method of claim 12, wherein the surface of the substrate is treated using a corona treatment.

14. The method of claim 1, wherein the polymer solution further comprises an adhesion promoter selected from the group comprising chlorinated polyolefin, non-chlorinated polyolefin, rosin, and aminosilane.

15. The method of claim 1, wherein the styrenic fluoropolymer is poly(α,β,β-trifluorostyrene) (PTFS), wherein the Hansen solubility parameter of the solvent/solvent blend satisfies $17.5<SP_b<19.5$, wherein the substrate is TAC or COP, and the solvent or solvent blend is one or more selected from the group comprising methyl isopropyl ketone (MIPK), acetone, methyl ethyl ketone (MEK), methyl isobutyl ketone (MIBK), cyclohexanone, methylene chloride (MeCl$_2$), chloroform, methyl acetate, ethyl acetate, n-butyl acetate, propylene glycol methyl ether acetate (PGMEA), ethylene glycol butyl ether acetate, toluene, cyclopentanone, 1,4-dioxane, acetophenone, chlorobenzene, nitrobenzene, N-methyl-2-pyrrolidone, and N,N-dimethylformamide.

* * * * *